United States Patent [19]
Mena

[11] Patent Number: 4,863,184
[45] Date of Patent: Sep. 5, 1989

[54] TRACTOR-TRAILER LANDING GEAR MECHANISM AND METHOD OF USING SAME

[76] Inventor: Daniel Mena, 110 N. 2nd Ave., #57, Chula Vista, Calif. 92010

[21] Appl. No.: 90,763

[22] Filed: Aug. 28, 1987

[51] Int. Cl.$^4$ .............................................. B66F 3/06
[52] U.S. Cl. ..................... 280/475; 212/189; 254/419; 280/763.1; 280/766.1; 280/6.12
[58] Field of Search .................... 280/475, 766.1, 6 H, 280/6 R, 432, 433, 763.1, 3, 43.2; 180/41; 254/418, 419, 424, 427; 212/189

[56] References Cited

U.S. PATENT DOCUMENTS

| | | | |
|---|---|---|---|
| 3,402,915 | 9/1968 | Dalton | 254/419 |
| 3,523,698 | 8/1970 | Bishop | 280/766.1 |
| 3,702,181 | 11/1972 | Keller, Jr. et al. | 212/189 X |

FOREIGN PATENT DOCUMENTS

| | | | |
|---|---|---|---|
| 2904110 | 8/1980 | Fed. Rep. of Germany | 254/103 |
| 55-038 | 4/1980 | Japan | 280/763.1 |
| 260124 | 1/1971 | U.S.S.R. | 212/189 |

Primary Examiner—Mitchell J. Hill
Attorney, Agent, or Firm—Bernard L. Kleinke; Jerry R. Potts; William P. Waters

[57] ABSTRACT

A tractor-trailer landing gear mechanism for helping support a trailer end, includes a pair of elongated extendable and retractable telescoping legs. A reversible electrical motor interconnects the legs, for causing them to be retracted or extended to a desired predetermined latching position. The upright tubular member includes a plurality of outwardly extending bores, for receiving a plurality of corresponding latching pins. A plurality of similar normally deactivated solenoids are disposed on the outer sleeve to drive a safety pin into latching engagement with a corresponding bore, when the leg is extended to a desired length. A plurality of normally deactivated detectors are mounted on corresponding solenoids, for sensing the presence of a predetermined latching position. A control board includes a plurality of manually activated switches, for causing the motor to rotate in predetermined directions, and for causing the landing gear mechanism to either retract or extend.

16 Claims, 1 Drawing Sheet

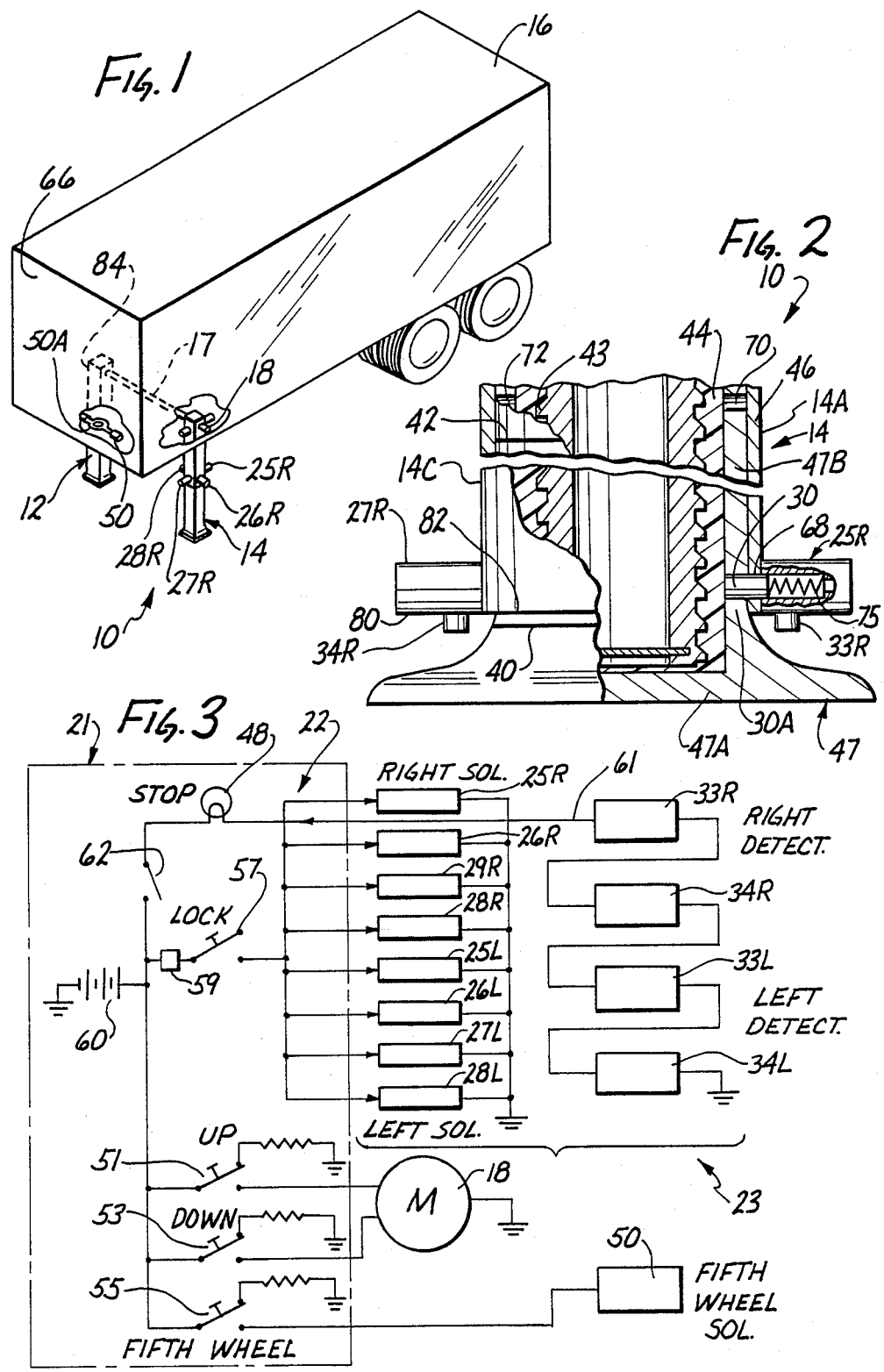

TRACTOR-TRAILER LANDING GEAR MECHANISM AND METHOD OF USING SAME

TECHNICAL FIELD

The present invention relates in general to a land vehicle load support system and a method of using it. More particularly, the invention relates to a new and improved tractor-trailer truck landing gear mechanism and a method of using it.

BACKGROUND ART

Conventional tractor-trailer truck landing gear mechanisms are generally used to level and to support heavy trailers in the absence of the tractor which normally supports the front end of the trailer. The conventional landing gear mechanism is usually operated by a handle attached to one end of a rotatable shaft. A gear mechanism transmits such rotational movement of the handle to a pair of telescoping legs, for extending or retracting the landing gear mechanism. The extension or retraction of the landing gear mechanism is also used for coupling or uncoupling a fifth wheel used for coupling the tractor and trailer.

Such manual operation of the landing gear mechanism, however, has proven to be less than satisfactory in that it is relatively dangerous, slow, awkward, difficult, expensive, exhausting and time consuming to operate. In this respect, and as illustrated in U.S. Pat. No. 1,093,590, the conventional landing gear mechanism includes rotatable teeth for engaging a gear device, to cause the desired extension or retraction of the telescoping legs. The frequent use of the landing gear mechanism, however, and the heavy weight supported thereby, can cause the teeth to wear, and eventually to fracture, thereby causing the supported structure to collapse inadvertently. In which event, the operator is generally required to report the incident to the highway authorities, and to restore the trailer to a levelled position with a crane or the like. Such unwanted and undesirable event is costly and time consuming.

As exemplified by the following U.S. Pat. Nos. 1,093,590; 3,523,698; 3,622,178; 3,874,682; 4,116,315; 4,281,852; 4,345,779; 4,462,612; and 4,466,637, several solutions have been attempted in the field to remedy the foregoing problems.

One such attempted solution to facilitate the proper operation of the landing gear mechanism, is described in U.S. Pat. No. 4,345,779. The patent describes a rotary drive unit which is driven by air under pressure supplied by the towing vehicle. While the use of the rotary drive unit may assist the extension and retraction of the landing gear mechanism, it has further compounded the problems associated with the conventional landing gears. Since the source of pressure for the rotary drive unit is generally the brake line of the towing vehicle, the continuous and frequent use of the hydraulic system of the brakes line, may cause undue strain and wear on the critical portion of the vehicle. Thus, such attempted solution has proven to be less than satisfactory, in that it has increased the danger and risk of injury to the operating personnel, and has not solved the problem of the inadvertent collapse of the landing gear mechanism.

In order to remedy the danger caused by the leak of the brakes line system, attempts have been made to include additional hydraulic devices to operate the landing gear mechanism. This attempted solution is not entirely satisfactory, in that the additional hydraulic devices are relatively bulky and expensive to install, operate and maintain. Also, a large reservoir of hydraulic fluid is required to develop the necessary hydraulic power.

While the various lifting gears, which are disclosed in the foregoing references, may be suitable for some applications, it would be highly desirable to have a new and improved landing gear mechanism and a method of using it, such that the landing gear is less likely to collapse under the load of the trailer, even after repeated use of the gear. Such landing gear mechanism should be simple and safe to operate, and should facilitate the coupling and releasing of the fifth wheel. The inventive landing gear mechanism should also be relatively inexpensive to install on existing structures, to operate and to maintain.

DISCLOSURE OF INVENTION

Therefore, it is the principal object of the present invention to provide a new and improved land vehicle landing gear mechanism, and method of using it, in such a manner to reduce greatly the risk of inadvertent collapse of the mechanism under load.

It is another object of the present invention to provide such a new and improved landing gear mechanism and method of using it, which mechanism is relatively inexpensive to install on existing structures, to operate and to maintain, and which mechanism facilitates the coupling and uncoupling of the fifth wheel.

Briefly, the above and further objects and features of the present invention are realized by providing a landing gear mechanism for supporting and varying the height of a load, such as a trailer end, and to permit coupling or uncoupling of the trailer end from a towing vehicle tractor. The landing gear mechanism includes a pair of elongated extendable and retractable legs, which help raise and lower the front end of the trailer in the absence of its tractor.

Each leg has a base, and a pair of telescoping inner and outer sleeves. The base includes an upright tubular concentric member disposed intermediate the inner and outer sleeves for enabling the base to move vertically, slidingly relative to the outer sleeve.

A reversible electrical motor drives the legs, for retracting or extending them to desired positions. The upright tubular member includes a plurality of bores, for receiving into locking engagement a plurality of corresponding pins to help secure the legs in position under load, thereby reducing greatly the risk of an inadvertent collapse of the legs.

A plurality of similar normally deactivated solenoids are disposed on the outer sleeve. Each one of the solenoids houses a safety pin or stud, and causes it to be driven into locking engagement with a corresponding bore, when a locking position is reached. A plurality of normally deactivated detectors are mounted on corresponding solenoids, for sensing the presence of a predetermined locking position. A control board includes a plurality of manually activated switches, for causing the motor to rotate in predetermined directions to either retract or extend the legs, and for causing the release of a fifth wheel for the vehicle.

Thus, the present inventive landing gear mechanism can be operated by a simple actuation of a few switches on the control board, to either extend or retract the telescoping legs, and to lock the mechanism in a secure position. Moreover, the operator can disengage the trailer from the towing tractor, by activating a single switch on the control board.

The present inventive landing gear mechanism is also safe and reliable to use. The safety pins engage lockingly the inner and outer sleeves of the legs to provide a back up safety measure, in the event of failure of the gear mechanism. Also, the use of an electrical motor, rather than a hydraulic device, dispenses with the necessity of installing large reservoirs of hydraulic fluids, and further eliminates the possible danger related to excess use of the brakes line system for this auxiliary function.

BRIEF DESCRIPTION OF DRAWINGS

The above mentioned and other objects and features of this invention and the manner of attaining them will become apparent, and the invention itself will be best understood by reference to the following description of an embodiment of the invention in conjunction with the accompanying drawings, wherein:

FIG. 1 is a pictorial view of a trailer, showing the landing gear mechanism which is constructed in accordance with the present invention, and which is illustrated in its extended position to help support the trailer;

FIG. 2 is an enlarged fragmentary, sectional elevational view of the landing gear mechanism of FIG. 1; and FIG. 3 is a schematic circuit diagram of a control board and safety mechanism for the landing gear mechanism of FIG. 1.

BEST MODE FOR CARRYING OUT THE INVENTION

Referring to the drawings, and more particularly to FIGS. 1 and 2 thereof, there is illustrated a landing gear mechanism 10 for helping support a trailer 16 of a tractor-trailer truck (the tractor of which not being shown for illustration purposes), which mechanism is constructed in accordance with the present invention.

The mechanism 10 includes a pair of generally similar elongated telescoping legs 12 and 14, having a substantially rectangular cross-section throughout their lengths. The legs 12 and 14 support the front end of the trailer 16 in place of its tractor (not shown), or like vehicle or other structure. The mechanism 10 is operated electrically by a reversible motor 18 (FIG. 1) which is mounted conveniently on either leg 12 or leg 14, as illustrated in FIG. 1, for extending or retracting the mechanism 10 and for coupling or uncoupling the vehicle fifth wheel (not shown) by activating its handle (not shown).

The mechanism 10 further includes a safety device, which is generally indicated at 23, as illustrated in FIG. 3. The safety device 23 generally detects a desired locking position, and causes a plurality of safety pins or rods, such as the safety pin 30 (FIG. 2), to be driven into a secure latching engagement with the telescoping leg 14.

As best illustrated in FIG. 3, the operation of the mechanism 10 is generally actuated by a control circuitry 22. The control circuitry 22 is mounted on a single control board or panel 21, and is positioned on the vehicle in any convenient location, such as on the trailer 16, next to the mechanism 10. Alternatively, it will become apparent to those skilled in the art that the control panel 21 may be positioned in the tractor (not shown) by interconnecting the panel electrically to the mechanism 10 by a wireless radio link (not shown).

In operation, the control circuitry 22 is generally used to cause the coupling or to cause the uncoupling of the tractor portion of the fifth wheel (not shown) and the trailer portion 50A of the fifth wheel, and to control the safety device 23. Assume that the trailer 16 is raised to a levelled position horizontally, as illustrated in FIG. 1, and it is desired to lift the forward end 66 of the trailer 16 to a height sufficient to engage the tractor (not shown). The operator activates a toggle switch 57 on the control board 21, to cause the legs 12 and 14 to be released from their latched positions. The operator then presses a normally-opened UP switch 51 on the control board 21, to cause the supporting legs 12 and 14 to be extended, for lifting a forward trailer end 66, and thus a trailer portion (not shown) of the fifth wheel upwardly, past the tractor portion (not shown) of the fifth wheel. Only the actuator handle 50A (FIG. 1) of the fifth wheel is shown in the drawings for sake of clarity.

During the extension of the mechanism 10, a plurality of detectors, such as the detectors 33R, 34R, 33L, and 34L, which are disposed on the legs 12 and 14, provide an indication to the operator that a predetermined latching position has been reached. The operator then makes a visual determination as to whether the desired height of the forward end 66 has been reached.

When the desired position has, in fact, been reached, the operator releases the spring-biased UP switch 51 to stop further movement of the legs, and then deactivates the toggle switch 57, for latching the mechanism 10 safely into position. The tractor is then driven toward the trailer 16, and the forward end 66 of the trailer 16 is lowered for coupling the tractor and trailer portions of the fifth wheel. For this purpose, the operator activates the toggle switch 57, and presses the DOWN button 53 on the control board 21 concurrently, for unlocking the legs 12 and 14, and for retracting the mechanism 10.

When the trailer 16 is towed to its destination, and it is desired to disengage it from the tractor, the operator repeats the foregoing steps as described in connection with the coupling process, with the additional step of pressing a normally-opened FIFTH WHEEL switch 55 on the control board 21, for uncoupling the tractor and trailer portions of the fifth wheel.

In this respect, the operator first activates the toggle switch 57 for unlocking the legs 12 and 14. The operator then closes the FIFTH WHEEL switch 55 concurrently, for uncoupling the tractor and trailer portions of the fifth wheel by moving the fifth wheel handle 50A, as hereinafter described in greater detail. The operator then closes the UP switch 51 to raise the forward end 66 of the trailer 16, for uncoupling the tractor and trailer portions of the fifth wheel.

Considering now the legs 12 and 14 in greater detail, with respect to FIGS. 1 and 2, they are generally similarly constructed and dimensioned. Therefore, only the leg 14 will now be described in greater detail.

The leg 14 is generally rectangular or square in cross section throughout its length, and includes a pair of upright elongated telescoping inner and outer sleeves 44 and 46, which are constructed generally according to well known techniques. The leg 12 further includes a base 47 which is disposed intermediate the inner and outer sleeves 44 and 46. The base 47 includes an integrally-connected foot 47A for resting on a substantially flat surface, such as the ground, and an upright elongated tubular member 47B which is concentrically telescopically disposed intermediate the inner and outer sleeves 44 and 46. Both the base 47 and the inner sleeve 44 move vertically in unison relative to the fixed outer sleeve 46. Furthermore, the upright tubular member 47B has a generally smooth outer periphery, to enable it to slide freely relative to the inner wall of the outer sleeve 46. A more detailed description of the leg 14 is described in the U.S. Pat. No. 1,093,590 to Starbuck.

As shown in FIG. 1, a drive shaft 17 of a reversible motor 18 extends transversely between the legs 12 and 14, and is suitably journaled for rotation, for causing the legs to be extended or retracted. While the motor 18 is illustrated in FIG. 1 as being secured to the upper portion of the leg 12, it could be alternatively coupled to the shaft 17 between the legs 12 and 14 by known techniques.

Considering now the safety device 23 in greater detail, with respect to FIGS. 2 and 3, it generally comprises a plurality of similar normally deactivated solenoids, such as the solenoids 25R through 28R, and 25L through 28L. The solenoids 25R through 28R are generally symmetrically coplanarly mounted, one on each face or side of the outer sleeve 46. The solenoids 25L through 28L are similarly mounted on the faces or sides of the outer sleeve 84 (FIG. 1) of the leg 12, and are generally coplanarly disposed with the solenoids 25R through 28R.

As further illustrated in FIG. 2, each of the solenoids, such as the solenoid 27R is disposed on the legs, such as the leg 14, so as to cause the bottom side 80 of the solenoid frame to be substantially flush with the terminal lower edge 82 of the outer sleeve 46.

Each one of the solenoids, such as the solenoid 25R, generally houses a spring, such as a spring 75 (FIG. 2), for urging resiliently a safety pin or stud 30 into a latching position. In this regard, the tubular member 47B has a plurality of radially extending, generally horizontal bores, such as the bores 30A, 70 and 72, which are designed to receive corresponding safety pins, such as the pin 30. The outer sleeve 46 includes a plurality of holes, such as the hole 68, which is disposed in axial alignment with the pin 30 and with the bore 30A, for allowing the pin 30 to pass therethrough, into latching engagement with the base 47.

As shown in FIG. 2, the bore 30A, is aligned with the pin 30 and the bore 68, for receiving the pin 30, when the spring 75 drives the pin 30 in a latching position. Thus, when the solenoid 25R is deactivated, the spring 75 forces the pin 30 into engagement with the bore 30A, for locking the mechanism 10, into a safe and secure position. In the accidental event of a failure of the mechanism 10, such as a failure of the ratchet teeth 43, the safety pins, such as the safety pin 30, maintain the mechanism 10 in a levelled position by preventing the telescoping legs from slipping relative to one another, and thus causing the leg to collapse under the considerable weight of the trailer.

When the solenoid 25R is energized, it causes the pin 30 to retract from the bores 30A and 68, and to retract the spring 75 resiliently into a stressed condition. Thus, when the pin 30 is disengaged from the leg 14, the mechanism 10 is unlocked, and can be retracted or extended at will.

As shown in FIGS. 2 and 3, the safety device 23 includes a plurality of normally off detectors, such as the detectors 33R, 34R, 33L and 34L. The detectors 33R and 34R are substantially coplanarly mounted on a pair of oppositely disposed solenoids such as the solenoids 25R and 27R. As further illustrated in FIG. 2, the detector 34R is mounted on the bottom side 80 of the solenoid 27R, for scanning the inner sleeve 44, for indicator marks, such as the marks 40 and 42, which are indicative of the locking positions of the leg 14. The detector 33R is also mounted on the solenoid 25R in a similar manner as the detector 34R. Similarly, the detectors 33L and 34L are generally coplanarly mounted on a pair of solenoids, such as the solenoids 25L and 27L, which are generally oppositely disposed on the outer sleeve of the leg 12.

The detectors, such as the detectors 33R and 34R are deactivated during the upright travel of the outer sleeve 46, between a pair of consecutive locking positions. Each one of such locking positions is generally delineated by a dark mark, such as the mark 42, which encircles the outer periphery of the outer sleeve 46. The marks, such as the marks 40 and 42, are generally coplanarly disposed in parallel substantially horizontal transverse planes.

When either detector, such as the detector 33R, senses a predetermined locking position by detecting a dark mark such as the mark 42, the detector generates an output signal indicative of its conductive state. Similarly, detectors 33L and 34L generate output signals indicative of their conductive states when they detect a mark. The outputs of all the detectors, such as the detector 33R, 34R, 33L, and 34L, are then compared concurrently, in order to determine the occurrence of any undesirable shift or tilt of the inner sleeves such as the inner sleeve 44, relative to the corresponding outer sleeves such as the outer sleeve 46.

Therefore, when all the detectors 33R, 34R, 33L, and 34L are conductive, a visual indicator in the form of a lamp 48 on the control board 21, is energized. It will become apparent to those skilled in the art that other types and kinds of indicators may also be employed. For example, an audible indicator, such as a bill or buzzer may also be employed, if desired.

The illumination of the lamp 48 indicates to the operator that the mechanism 10 is properly operational, and that the operator can now lock the mechanism 10 safely, at that particular predetermined locking position.

Considering now the control board 21 in greater detail, with respect to FIG. 3, it generally includes the UP switch 51 and the DOWN switch 53. A remotely located power source, such as a battery 60, energizes the reversible motor 18, when either of the UP or DOWN switches 51 or 53, is depressed. In this regard, the UP and DOWN switches control the direction of rotation of the reversible electrical motor 18, either to extend or to retract the mechanism 10.

The FIFTH WHEEL switch 55 is also connected to the battery 60, and when the switch 55 is closed, it causes the deactivation of the FIFTH WHEEL solenoid 50. The normally opened toggle switch 57 is between the battery 60 and the solenoids 25R through 28R, and 25L through 28L, for activating them when the switch 57 is closed.

A relay 59 is connected between the switch 57 and the battery 60, and has a normally opened contact 62 connected between the battery 60, and the indicator lamp 48, for interrupting the current flow to the detectors 33R, 34R, 33L and 34L. Thus, when the mechanism 10 is in a latched position, it is desirable that the contact 62 interrupt the current flow to the detectors 33R, 34R, 33L and 34L, in order to prevent the drainage of the battery 60.

For the purpose of deactivating the detectors 33R, 34R, 33L and 34L, the relay 59 controls the contact 62.

When the toggle switch 57 is closed, an electrical path is established between the battery 60 and the solenoids 25R through 28R and 25L through 28L, through the relay 59 and the toggle switch 57. The activation of the toggle switch 57 causes the contact 62 to be closed, and thereby to establish an electrical path between the battery 60 and the detectors 33R, 34R, 33L and 34L, for energizing them, when they sense specific level indicators or marks, such as the mark 42.

Conversely, when the toggle switch 57 is opened, the relay 59 is de-energized, for causing its contacts 62 to be opened, to interrupt the current flow to the detectors 25R through 28R and 25L through 28L.

The control board 21 is generally used to cause the coupling or uncoupling of the tractor portion of the fifth wheel (not shown) from the trailer portion of the fifth wheel, and to lock the mechanism 10 in a safe and secure locking position. For instance, if the trailer 16 is in a raised, horizontally levelled position, as illustrated in FIG. 1, and it is desired to lift the forward end 66 of the trailer 16 to a height sufficient to engage the tractor, the operator closes the toggle switch 57, to energize the solenoids 25R through 28R and 25L through 28L. The activation of such solenoids causes the corresponding safety pins, such as the safety pin 30 to retract from the corresponding bores, such as the bores 30A and 68, for releasing the outer sleeve 46 from its locked position, and for freeing it to move in the desired direction.

Next, the UP switch 51 is pressed to activate the motor 18, and to cause it to rotate in such a direction as to cause both legs 12 and 14 to extend simultaneously, in order to raise the forward end 66 of the trailer 16 upwardly. During the upward journey of the outer sleeve 46, the detectors 33 and 34 remain in a non-conductive state, as long as they do not sense a dark 1 mark, such as the mark 42.

When the detectors 33R, 34R, 33L and 34L are activated simultaneously, the indicator lamp 48 is energized to alert the operator that a predetermined latching position has been reached. The operator then visually inspects the height of the forward end 66 of the trailer 16, and determines whether such height is sufficient for his or her particular purposes. If the height of the forward end 66 is not sufficient, the operator maintains the UP button 51 pressed for extending the legs 12 and 14 still further. The indicator lamp 48 is also deenergized since the detectors 33R, 34R, 33L and 34L are caused to travel beyond the level of the marks. When the desired height of the forward end 66 is reached, and the detectors 33R, 34R, 33L and 34L sense the next dark mark, such as the mark 42, the indicator lamp 48 is reactivated. Whereupon, if the desired height is reached, the operator releases the UP switch 51, for deenergizing the motor 18.

Thereafter, the operator then opens the toggle switch 57 for deactivating the solenoids 25R through 28R, and 25L through 28L, and the detectors 33R, 34R, 33L, and 34L, to prevent the unnecessary drainage of the battery 60, when the mechanism 10 is in a secure locking position.

The tractor is then driven toward the trailer 16, and the forward end 66 is lowered for coupling the tractor and trailer portions to the fifth wheel. The operator then closes the toggle switch 57 for reactivating the solenoids 25R through 28R and 25L through 28L, and the detectors 33R, 34R, 33L and 34L, for disengaging the safety pins such as the safety pin 30, from their corresponding bores, such as the bore 30A. The operator then closes the DOWN switch 53, for causing the motor 18 to rotate in a reverse direction, in order to lower the trailer portion of the fifth wheel into secure engagement with the tractor portion thereof. The DOWN switch 53 is then released, and the toggle switch 57 is opened.

While the control board 21 has been described and illustrated in FIG. 3, as being electrically connected to the solenoids 25R through 28R, and 25L through 28L, to the detectors 33R, 34R, 33L and 34L, to the motor 18, and to the FIFTH WHEEL solenoid 50, the electrical path could alternatively include a radio communication link (not shown), for causing the control board 21 to control remotely the operation of the mechanism 10.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. A landing gear mechanism for coupling and uncoupling a tractor-trailer and for supporting a trailer and independently of the tractor, the landing gear mechanism comprising:

at least one elongated extendable and retractable leg, being disposed suitably to raise and to lower the trailer end wherein said leg includes a pair of inner and outer telescoping sleeves to permit said leg to extend or to retract, and wherein said leg further includes a base having an upright tubular member disposed intermediate said inner and outer sleeves for sliding frictionally therebetween;

electrical means for extending and retracting said leg to desired predetermined lockable position;

means for locking mechanically said leg in said lockable position safety means for detecting the predetermined lockable position of said leg locking said means including a plurality of bores, extending outwardly radially on said upright tubular member;

a plurality of generally similar normally deactivated solenoids being oppositely disposed on said outer sleeve, in registration with one of the corresponding plurality of bores each one of said on an tubular member solenoids housing a pin for engaging lockingly one of said bores on pad tubular member when the locking position is reached; and remotely located control means for actuating said locking means.

2. A landing gear mechanism according to claim 1, wherein said locking means includes four solenoids being generally coplanarly disposed along the periphery of said outer sleeve.

3. A landing gear mechanism according to claim 2, wherein said inner sleeve includes at least one group of four bores, being disposed at various predetermined heights on the inner sleeve, for receiving corresponding ones of said pins.

4. A landing gear mechanism according to claim 2, wherein said safety means further includes a plurality of marks disposed at various predetermined heights on said inner sleeve, for activating said detecting means when each one of said solenoids and its pin housed therein, reach a predetermined locking position.

5. A landing gear mechanism according to claim 1, wherein said safety means includes a plurality of generally similar normally deactivated detectors, each one of said detectors being mounted on one of said solenoids, for sensing and indicating the presence of a predetermined locking lockable position.

6. A landing gear mechanism according to claim 1, wherein said control means includes a manually activated switch, for retracting said pins from a corresponding ones of said bores.

7. A landing gear mechanism according to claim 6, wherein said electrical means for extending said leg includes a reversible motor.

8. A landing gear mechanism according to claim 7, wherein said control means further includes switch means for causing said motor to rotate in predetermined directions, for causing it to extend or to retract said leg; and means for indicating the presence of said pins in said pre-determined lockable positions.

9. A landing gear mechanism according to claim 8, wherein said switch means includes a first switch for causing said leg to extend, and a second switch for causing said leg to retract.

10. A landing gear mechanism according to claim 9, further including a coupling means having activator handle means disposed on the trailer end, and said control means further including a switch for disengaging said coupling means.

11. A method of using the landing gear mechanism of claim 10, including the steps of:

extending said leg to the desired, predetermined locking position; and retracting said leg to the desired lockable position.

12. A method of using the landing gear mechanism of claim 1, wherein said step of extending said leg, includes energizing said manually activated switch for retracting said pin from a corresponding one of said bores, in order to unlock said leg;

activating said first switch concurrently for causing said motor to rotate in a predetermined direction, o cause said leg to extend;

deactivating said first switch when said indicating means is energized; and deenergizing, said manually activated switch means for permitting said pin to move into locking engagement with a corresponding one of said bores.

13. A method of using the landing gear mechanism of claim 11, wherein said step of retracting said leg, includes a manually activated switch for retracting said pin from corresponding ones of said bores, in order to unlock said leg;

activating said second switch concurrently for causing said motor to rotate in a predetermined direction, to cause said leg to retract;

deactivating said second switch when said indicating means is energized; and deenergizing said manually activated means for forcing said pin into locking engagement with a corresponding one of said bores.

14. Landing gear mechanism control apparatus for a landing gear mechanism including a pair of telescoping legs, comprising: means for extending drivingly the telescoping legs, pin means for interconnecting each one of said legs said leg are disposed in their extended positions;

electrical control means for activating said pin means;

manually operable switch means for causing said electrical control means to activate said pin means;

wherein each of said legs inner and outer telescoping sleeves and further includes a base having an upright tubular member disposed intermediate said inner and outer sleeves for sliding frictionally therebetween;

said means for locking mechanically said pair of legs in a locking position means includes a plurality of bores, extending outwardly radially on said upright tubular member, and a plurality of generally similar normally deactivated solenoids being oppositely disposed on said outer sleeve, in registration with one of the corresponding plurality of bores, each one of said solenoids controlling the movement of said pin means for engaging lockingly one of said plurality of bores, when said locking position is reached.

15. Landing gear mechanism according to claim 14, wherein each one of said solenoids houses a spring and a safety pin; and wherein said spring is adapted to urge resiliently said pin into a latching position.

16. Landing gear mechanism according to claim 15, wherein said manually operable switch means includes a plurality of switches; and wherein said electrical control means includes a plurality of detectors.

* * * * *

UNITED STATES PATENT AND TRADEMARK OFFICE
CERTIFICATE OF CORRECTION

PATENT NO. : 4,863,184

DATED : 09/05/89

INVENTOR(S) : Daniel Mena

It is certified that error appears in the above-identified patent and that said Letters Patent is hereby corrected as shown below:

Column 4, line 57, after "leg 14", insert --having an outer surface 14A--.

Column 8, line 45, after "bores", delete "each one of said on an tublar member", and substitute therefor --on said tubular member, each one of said--.

Column 8, line 47, after "on", delete "pad" and substitute therefor --said--.

Column 9, line 3, after "predetermined", delete "locking".

Column 9, line 33, after "claim", delete "1", and substitute therefor --11--.

Column 10, line 27, after "position", please insert --;--, and move remaining text to a new paragraph.

Column 10, line 27, before "means", insert --said locking--.

Column 10, line 39, after "a", delete "safety".

Column 10, line 26, before "means" delete "said".

Signed and Sealed this

Fourteenth Day of May, 1991

*Attest:*

HARRY F. MANBECK, JR.

*Attesting Officer*   *Commissioner of Patents and Trademarks*